(12) United States Patent
Julian et al.

(10) Patent No.: US 8,059,573 B2
(45) Date of Patent: Nov. 15, 2011

(54) METHOD OF PAIRING DEVICES

(75) Inventors: David Jonathan Julian, San Diego, CA (US); Zhanfeng Jia, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 383 days.

(21) Appl. No.: 11/830,646

(22) Filed: Jul. 30, 2007

(65) Prior Publication Data
US 2009/0034591 A1    Feb. 5, 2009

(51) Int. Cl.
*H04H 20/71* (2008.01)
(52) U.S. Cl. .................. 370/312; 370/238; 370/313
(58) Field of Classification Search .......... 370/238, 370/312, 313; 455/42.1, 556.1
See application file for complete search history.

(56) References Cited

U.S. PATENT DOCUMENTS

| | | | |
|---|---|---|---|
| 5,687,169 A | 11/1997 | Fullerton | |
| 5,764,696 A | 6/1998 | Barnes et al. | |
| 5,812,081 A | 9/1998 | Fullerton | |
| 5,832,035 A | 11/1998 | Fullerton | |
| 5,907,427 A | 5/1999 | Scalora et al. | |
| 5,952,956 A | 9/1999 | Fullerton | |
| 5,960,031 A | 9/1999 | Fullerton et al. | |
| 5,963,581 A | 10/1999 | Fullerton et al. | |
| 5,969,663 A | 10/1999 | Fullerton et al. | |
| 5,995,534 A | 11/1999 | Fullerton et al. | |
| 6,031,862 A | 2/2000 | Fullerton et al. | |
| 6,091,374 A | 7/2000 | Barnes | |
| 6,111,536 A | 8/2000 | Richards et al. | |
| 6,133,876 A | 10/2000 | Fullerton et al. | |
| 6,177,903 B1 | 1/2001 | Fullerton et al. | |
| 6,218,979 B1 | 4/2001 | Barnes et al. | |
| 6,295,019 B1 | 9/2001 | Richards et al. | |
| 6,297,773 B1 | 10/2001 | Fullerton et al. | |
| 6,300,903 B1 | 10/2001 | Richards et al. | |
| 6,304,623 B1 | 10/2001 | Richards et al. | |
| 6,351,652 B1 | 2/2002 | Finn et al. | |
| 6,354,946 B1 | 3/2002 | Finn | |
| 6,400,307 B2 | 6/2002 | Fullerton et al. | |
| 6,400,329 B1 | 6/2002 | Barnes | |
| 6,421,389 B1 | 7/2002 | Jett et al. | |

(Continued)

FOREIGN PATENT DOCUMENTS

EP        1239630        9/2002

(Continued)

OTHER PUBLICATIONS

"Specifications for WPANS" IEEE 802.15.1-2002, [Online] 2002, pp. 1057-1147, XP002503061.

(Continued)

*Primary Examiner* — Huy Vu
*Assistant Examiner* — Omer Mian
(74) *Attorney, Agent, or Firm* — Dang M. Vo

(57) ABSTRACT

Some aspects include a method of associating electronic devices for communicating data. The method includes receiving a message on a first device indicating that a second device is discoverable and pairable. The method further includes determining whether the first device is pairable, transmitting a pairing response to the second device based on the determination that the first device is pairable, and pairing the first device to the second device in response to the received message and the determination that the first device is pairable. For example, some aspects include devices such as headsets, watches, and medical devices configured to use such methods for communicating data.

46 Claims, 7 Drawing Sheets

U.S. PATENT DOCUMENTS

| | | |
|---|---|---|
| 6,430,208 B1 | 8/2002 | Fullerton et al. |
| 6,437,756 B1 | 8/2002 | Schantz |
| 6,462,701 B1 | 10/2002 | Finn |
| 6,466,125 B1 | 10/2002 | Richards et al. |
| 6,469,628 B1 | 10/2002 | Richards et al. |
| 6,483,461 B1 | 11/2002 | Matheney et al. |
| 6,489,893 B1 | 12/2002 | Richards et al. |
| 6,492,904 B2 | 12/2002 | Richards |
| 6,492,906 B1 | 12/2002 | Richards et al. |
| 6,501,393 B1 | 12/2002 | Richards et al. |
| 6,504,483 B1 | 1/2003 | Richards et al. |
| 6,512,455 B2 | 1/2003 | Finn et al. |
| 6,512,488 B2 | 1/2003 | Schantz |
| 6,519,464 B1 | 2/2003 | Santhoff et al. |
| 6,529,568 B1 | 3/2003 | Richards et al. |
| 6,538,615 B1 | 3/2003 | Schantz |
| 6,539,213 B1 | 3/2003 | Richards et al. |
| 6,549,567 B1 | 4/2003 | Fullerton |
| 6,552,677 B2 | 4/2003 | Barnes et al. |
| 6,556,621 B1 | 4/2003 | Richards et al. |
| 6,560,463 B1 | 5/2003 | Santhoff |
| 6,571,089 B1 | 5/2003 | Richards et al. |
| 6,573,857 B2 | 6/2003 | Fullerton et al. |
| 6,577,691 B2 | 6/2003 | Richards et al. |
| 6,585,597 B2 | 7/2003 | Finn |
| 6,593,886 B2 | 7/2003 | Schantz |
| 6,606,051 B1 | 8/2003 | Fullerton et al. |
| 6,611,234 B2 | 8/2003 | Fullerton et al. |
| 6,614,384 B2 | 9/2003 | Hall et al. |
| 6,621,462 B2 | 9/2003 | Barnes |
| 6,636,566 B1 | 10/2003 | Roberts et al. |
| 6,636,567 B1 | 10/2003 | Roberts et al. |
| 6,636,573 B2 | 10/2003 | Richards et al. |
| 6,642,903 B2 | 11/2003 | Schantz |
| 6,661,342 B2 | 12/2003 | Hall et al. |
| 6,667,724 B2 | 12/2003 | Barnes et al. |
| 6,670,909 B2 | 12/2003 | Kim |
| 6,671,310 B1 | 12/2003 | Richards et al. |
| 6,674,396 B2 | 1/2004 | Richards et al. |
| 6,677,796 B2 | 1/2004 | Brethour et al. |
| 6,700,538 B1 | 3/2004 | Richards |
| 6,710,736 B2 | 3/2004 | Fullerton et al. |
| 6,717,992 B2 | 4/2004 | Cowie et al. |
| 6,748,040 B1 | 6/2004 | Johnson et al. |
| 6,750,757 B1 | 6/2004 | Gabig, Jr. et al. |
| 6,759,948 B2 | 7/2004 | Grisham et al. |
| 6,760,387 B2 | 7/2004 | Langford et al. |
| 6,762,712 B2 | 7/2004 | Kim |
| 6,763,057 B1 | 7/2004 | Fullerton et al. |
| 6,763,282 B2 | 7/2004 | Glenn et al. |
| 6,774,846 B2 | 8/2004 | Fullerton et al. |
| 6,774,859 B2 | 8/2004 | Schantz et al. |
| 6,778,603 B1 | 8/2004 | Fullerton et al. |
| 6,781,530 B2 | 8/2004 | Moore |
| 6,782,048 B2 | 8/2004 | Santhoff |
| 6,788,730 B1 | 9/2004 | Richards et al. |
| 6,822,604 B2 | 11/2004 | Hall et al. |
| 6,823,022 B1 | 11/2004 | Fullerton et al. |
| 6,836,223 B2 | 12/2004 | Moore |
| 6,836,226 B2 | 12/2004 | Moore |
| 6,845,253 B1 | 1/2005 | Schantz |
| 6,847,675 B2 | 1/2005 | Fullerton et al. |
| 6,876,643 B1 * | 4/2005 | Aggarwal et al. ............ 370/338 |
| 6,879,878 B2 | 4/2005 | Glenn et al. |
| 6,882,301 B2 | 4/2005 | Fullerton |
| 6,895,034 B2 | 5/2005 | Nunally et al. |
| 6,900,732 B2 | 5/2005 | Richards |
| 6,906,625 B1 | 6/2005 | Taylor et al. |
| 6,907,244 B2 | 6/2005 | Santhoff et al. |
| 6,912,240 B2 | 6/2005 | Kumar et al. |
| 6,914,949 B2 | 7/2005 | Richards et al. |
| 6,917,284 B2 | 7/2005 | Grisham et al. |
| 6,919,838 B2 | 7/2005 | Santhoff |
| 6,922,166 B2 | 7/2005 | Richards et al. |
| 6,922,177 B2 | 7/2005 | Barnes et al. |
| 6,925,109 B2 | 8/2005 | Richards et al. |
| 6,933,882 B2 | 8/2005 | Fullerton |
| 6,937,639 B2 | 8/2005 | Pendergrass et al. |
| 6,937,663 B2 | 8/2005 | Jett et al. |
| 6,937,667 B1 | 8/2005 | Fullerton et al. |
| 6,937,674 B2 | 8/2005 | Santhoff et al. |
| 6,947,492 B2 | 9/2005 | Santhoff et al. |
| 6,950,485 B2 | 9/2005 | Richards et al. |
| 6,954,480 B2 | 10/2005 | Richards et al. |
| 6,959,031 B2 | 10/2005 | Haynes et al. |
| 6,959,032 B1 | 10/2005 | Richards et al. |
| 6,963,727 B2 | 11/2005 | Shreve |
| 6,980,613 B2 | 12/2005 | Krivokapic |
| 6,989,751 B2 | 1/2006 | Richards |
| 7,015,793 B2 | 3/2006 | Gabig, Jr. et al. |
| 7,020,224 B2 | 3/2006 | Krivokapic |
| 7,027,425 B1 | 4/2006 | Fullerton et al. |
| 7,027,483 B2 | 4/2006 | Santhoff et al. |
| 7,027,493 B2 | 4/2006 | Richards |
| 7,030,806 B2 | 4/2006 | Fullerton |
| 7,042,417 B2 | 5/2006 | Santhoff et al. |
| 7,046,187 B2 | 5/2006 | Fullerton et al. |
| 7,046,618 B2 | 5/2006 | Santhoff et al. |
| 7,069,111 B2 | 6/2006 | Glenn et al. |
| 7,075,476 B2 | 7/2006 | Kim |
| 7,079,827 B2 | 7/2006 | Richards et al. |
| 7,099,367 B2 | 8/2006 | Richards et al. |
| 7,099,368 B2 | 8/2006 | Santhoff et al. |
| 7,129,886 B2 | 10/2006 | Hall et al. |
| 7,132,975 B2 | 11/2006 | Fullerton et al. |
| 7,145,954 B1 | 12/2006 | Pendergrass et al. |
| 7,148,791 B2 | 12/2006 | Grisham et al. |
| 7,151,490 B2 | 12/2006 | Richards |
| 7,167,525 B2 | 1/2007 | Santhoff et al. |
| 7,170,408 B2 | 1/2007 | Taylor et al. |
| 7,184,938 B1 | 2/2007 | Lansford et al. |
| 7,190,722 B2 | 3/2007 | Lakkis et al. |
| 7,190,729 B2 | 3/2007 | Siwiak |
| 7,206,334 B2 | 4/2007 | Siwiak |
| 7,209,724 B2 | 4/2007 | Richards et al. |
| 7,230,980 B2 | 6/2007 | Langford et al. |
| 7,239,277 B2 | 7/2007 | Fullerton et al. |
| RE39,759 E | 8/2007 | Fullerton |
| 7,256,727 B2 | 8/2007 | Fullerton et al. |
| 7,271,779 B2 | 9/2007 | Hertel |
| 2002/0068604 A1 * | 6/2002 | Prabhakar et al. ............ 455/556 |
| 2005/0276310 A1 * | 12/2005 | Choi et al. .................... 375/130 |
| 2006/0083187 A1 | 4/2006 | Dekel |
| 2006/0274676 A1 * | 12/2006 | Niu et al. ...................... 370/255 |
| 2007/0197163 A1 * | 8/2007 | Robertson ................... 455/26.1 |

FOREIGN PATENT DOCUMENTS

| | | |
|---|---|---|
| EP | 1395002 | 3/2004 |

OTHER PUBLICATIONS

European Search Report—EP08006476, Search Authority—The Hague, Nov. 7, 2008.

International Search Report—PCT/US08/071426, International Search Authority—European Patent Office, Nov. 20, 2008.

Written Opinion—PCT/US08/071426, International Search Authority—European Patent Office, Nov. 20, 2008.

* cited by examiner

METHOD OF PAIRING DEVICES

BACKGROUND

1. Field

This application relates generally to communications, and more specifically, to wireless communication.

2. Background

Wireless technologies enable communications between devices and may be employed for a variety of applications associated with various wireless communication networks such as personal area network ("PAN") and body area network ("BAN"). Devices in such networks are typically subject to a discovery and pairing process to define a particular personal or body area network. Thus, a need exists for alternative methods and apparatuses for discovery and pairing of communication devices.

SUMMARY

A summary of sample aspects of the disclosure follows. For convenience, one or more aspects of the disclosure may be referred to herein simply as "some aspects."

Methods and apparatuses or devices being disclosed herein each have several aspects, no single one of which is solely responsible for its desirable attributes. Without limiting the scope of this disclosure, for example, as expressed by the claims which follow, its more prominent features will now be discussed briefly. After considering this discussion, and particularly after reading the section entitled "Detailed Description" one will understand how the features being described provide advantages that include improved discovery and pairing of devices in, for example, an Ultra-wideband (UWB) network.

Some aspects include a method of associating electronic devices for communicating data. The method includes receiving a message on a first device indicating that a second device is discoverable and pairable. The method further includes determining whether the first device is pairable, transmitting a pairing response to the second device based on the determination that the first device is pairable, and pairing the first device with the second device in response to the received message and the determination that the first device is pairable. For example, some aspects include devices such as headsets, watches, and medical devices configured to use such methods for communicating data.

DETAILED DESCRIPTION

Figure 1:
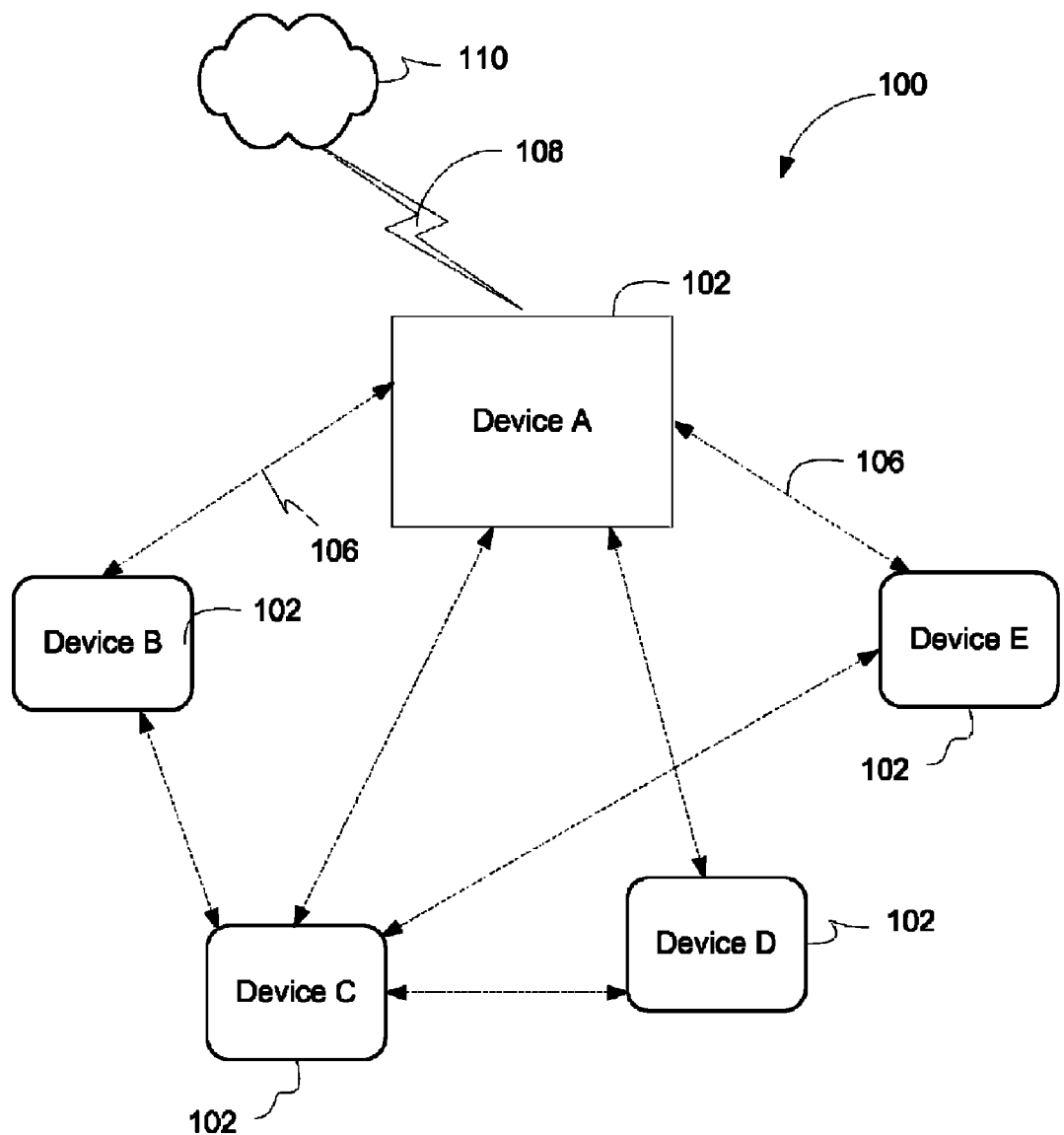
FIG. 1 is a block diagram illustrating an example system of wirelessly connected devices.

The following detailed description is directed to certain specific embodiments of the invention. However, the invention can be embodied in a multitude of different ways as defined and covered by the claims. In this description, reference is made to the drawings wherein like parts are designated with like numerals throughout.

The following detailed description is directed to certain specific aspects of the invention. However, the invention can be embodied in a multitude of different ways, for example, as defined and covered by the claims. It should be apparent that the aspects herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects communication channels between devices may be based on pulse position modulation. In some aspects, communication channels between devices may be based on a convolutional coding. In some aspects, communication channels may be based on pulse position modulation and convolutional coding.

Personal or body area networks may be defined by devices that have "paired" with each other. Pairing is a process by which devices register with each other, including under user control. Once paired, devices typically can communicate with each other whenever they are within range and active without re-performing the pairing process.

Before pairing, devices must first discover each other, for example, by entering a discoverable state in which devices discover each other through the exchange of discovery messages. Upon discovery, devices may pair with each other. Pairing is at least partly a security function to limit pairing to particular devices. For example, pairing may include an exchange of messages that may include password authentication schemes in which first device must respond with a password (such as a four digit number, which is often fixed at the factory for a device) to a second device to prevent unauthorized or undesired pairing of devices. In networking protocols such as Bluetooth, discovery and pairing are separate procedures. However, they are most often performed together. For some wireless devices, such complexity (e.g., password entry) merely makes device pairing difficult and cumbersome for many users. It has been found that adjusting the pairing process to be based on a pairable state, and optionally, on the temporal and physical co-location of devices, can simplify the process of pairing devices in a personal area network. According to one aspect, a device may enter a pairable state, e.g., based on input from a user control (e.g., by depressing a control button on a device). When such a device receives a discovery and pairing message from another device (which may also be placed in the pairable state by the user), the two devices may pair without further user interaction. Pairing with particular devices can be controlled, for example, based on the pairable state being maintained for a specified period during which time the other device is configured to be pairable or by limiting pairing to devices within a specified distance, or combinations thereof.

FIG. 1 is a block diagram illustrating an example system 100 of wirelessly connected devices 102 (e.g., labeled Device A, . . . , Device E). While five devices are shown in FIG. 1, examples of the system 100 may be configured to use any number of devices 102. The system 100 may comprise one or more of a personal area network (PAN) and/or a body area network (BAN). Each of the devices 102 may be configured to communicate via a wireless link 106. The system 100 may optionally include one or more devices 102 that comprise a longer range network interface, such as a mobile telephone, wireless Ethernet, a wired network, other suitable network interface, that is configured to communicate over a wireless link 108 The devices 102 may comprise devices such as headsets and watches (or other portable devices configured to display information such as caller id from a phone and/or messages (or portions thereof) such as email, short message system (SMS) messages, or any other type of data, including data received over the wireless links 106 and 108. Each of the devices 102 may communicate with one, two, or any number of the other devices 102.

One or more of the devices 102 may detect the presence of the other devices 102 when the other devices 102 initially communicate over the link 106. Two or more devices 102 may be paired through an exchange of messages over the link 106. For example, two devices 102 may pair when one of the two devices 102 first detects (by receiving a message over the wireless link 106) the other device 102. The pairing process may be based at least partly on a user's authorization of the pairing. The paired group of the devices 102 may define a particular personal or body area network.

As discussed further below, in some aspects the communications link 106 has a pulse-based physical layer. For example, the physical layer may utilize ultra-wideband pulses that have a relatively short length (e.g., on the order of a few nanoseconds) and a relatively wide bandwidth. In some aspects, an ultra-wide band may be defined as having a fractional bandwidth on the order of approximately 20% or more and/or having a bandwidth on the order of approximately 500 MHz or more. The fractional bandwidth is a particular bandwidth associated with a device divided by its center frequency. For example, a device according to this disclosure may have a bandwidth of 1.75 GHz with center frequency 8.125 GHz and thus its fractional bandwidth is 1.75/8.125 or 21.5%.

Those skilled in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Figure 2:
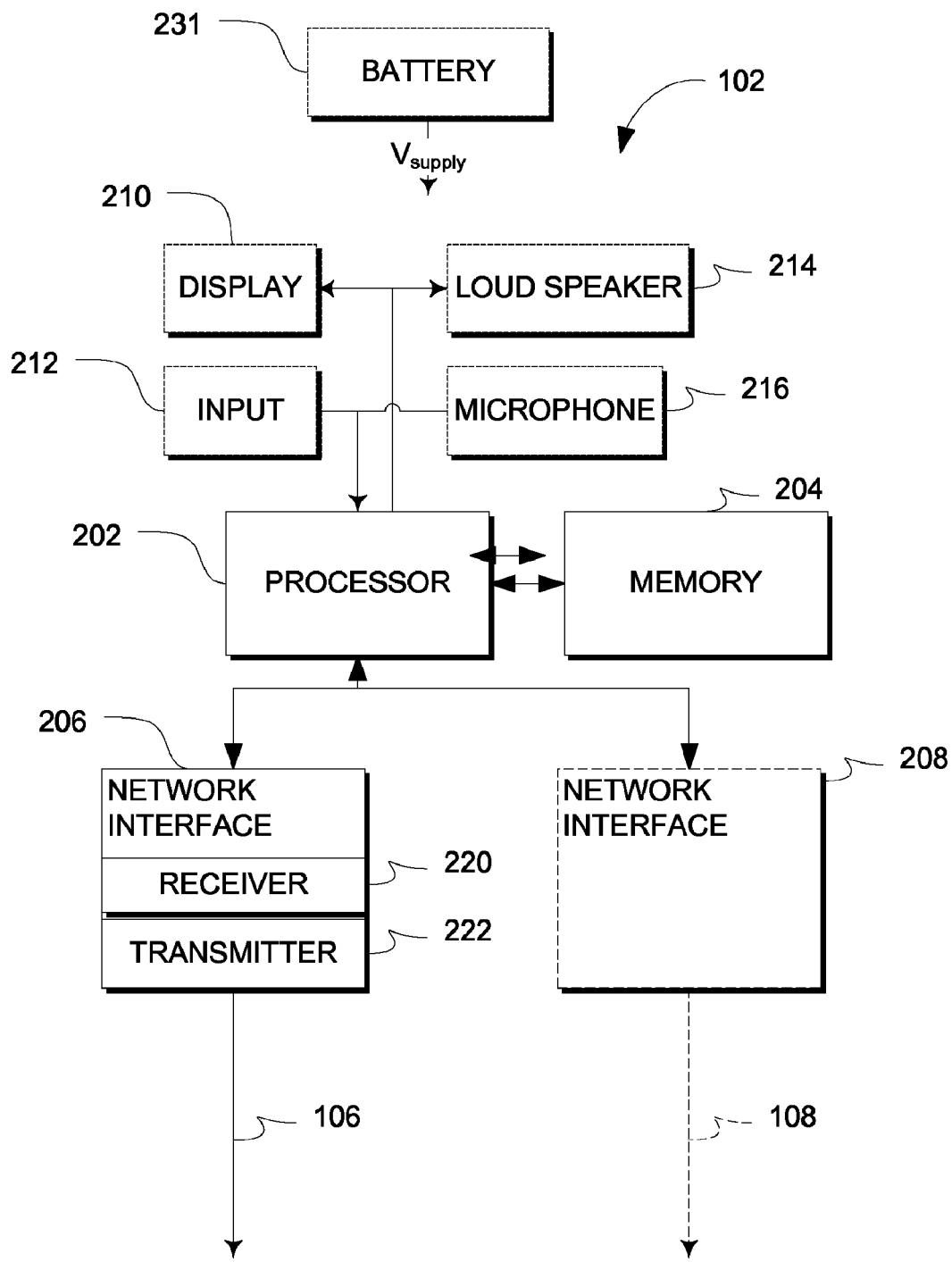
FIG. 2 is a block diagram illustrating an example of a wireless device such as illustrated in FIG. 1.

FIG. 2 is a block diagram illustrating an example of a wireless device 102. The device 102 includes a processor 202 that is in communication with a memory 204 and a network interface 206 for communicating via the wireless link 106. Optionally, the device 102 may also include one or more of a display 210, a user input device 212 such as a key, touch screen, or other suitable tactile input device, a loudspeaker 214 comprising a transducer adapted to provide audible output based on a signal received over the wireless link 106 and/or a microphone 216 comprising a transducer adapted to provide audible input of a signal that may be transmitted over the wireless link 106. For example, a watch may include the display 210 adapted to provide a visual output based on a signal received via the wireless communication link. A medical device may include one or more input devices 212 that include a sensor adapted to generate at least one sensed signal or sensed data to be transmitted via the wireless communication link 106.

The network interface 206 may include any suitable antenna (not shown), a receiver 220, and a transmitter 222 so that the exemplary device 102 can communicate with one or more devices over the wireless link 106. Optionally, the network interface 206 may also have processing capabilities to reduce processing requirements of the processor 202.

Optionally, the device 102 may include a second network interface 208 that communicates over the network 110 via a link 108. For example, the device 102 may provide connectivity to the other network 110 (e.g., a wide area network such as the Internet) via a wired or wireless communication link. Accordingly, the device 102 may enable other devices 102 (e.g., a Wi-Fi station) to access the other network 110. In addition, it should be appreciated that one or more of the devices 102 may be portable or, in some cases, relatively non-portable. The second network interface 208 may transmit and receive RF signals according to the IEEE 802.11 standard, including IEEE 802.11(a), (b), or (g), the BLUETOOTH standard, and/or CDMA, GSM, AMPS or other known signals that are used to communicate within a wireless cell phone network. In addition, the second network interface 208 may comprise any suitable wired network interface such as Ethernet (IEEE 802.3).

The device 102 may optionally include a battery 231 to provide power to one or more components of the device 102. The device 102 may comprise at least one of a mobile handset, a personal digital assistant, a laptop computer, a headset, a vehicle hands free device, or any other electronic device. In addition, the device 102 may comprise one or more of a biomedical sensor, biometric sensor, a pacemaker, or any other device for measuring or affecting a human body. In particular, the teachings herein may be incorporated into (e.g., implemented within or performed by) a variety of the devices 102. For example, one or more aspects taught herein may be incorporated into a phone (e.g., a cellular phone), a personal data assistant ("PDA"), an entertainment device (e.g., a music or video device), a headset (e.g., headphones, an earpiece, etc.), a microphone, a biometric sensor (e.g., a heart rate monitor, a pedometer, an EKG device, a keyboard, a mouse, etc.), a user I/O device (e.g., a watch, a remote control, a light switch, etc.), a tire pressure monitor, a computer, a point-of-sale device, an entertainment device, a hearing aid, a set-top box, or any other suitable device.

The components described herein may be implemented in a variety of ways. Referring to FIG. 2, the device or apparatus 102 is represented as a series of interrelated functional blocks that may represent functions implemented by, for example the processor 202, software, some combination thereof, or in some other manner as taught herein. For example, the processor 202 may facilitate user input via the input devices 212. Further, the transmitter 222 may comprise a processor for transmitting that provides various functionalities relating to transmitting information to another device 102. The receiver 220 may comprises a processor for receiving that provides various functionality relating to receiving information from another device 102 as taught herein.

As noted above, FIG. 2 illustrates that in some aspects these components may be implemented via appropriate processor components. These processor components may in some aspects be implemented, at least in part, using structure as taught herein. In some aspects, a processor may be adapted to implement a portion or all of the functionality of one or more of these components. In some aspects one or more of the components represented by dashed boxes are optional.

In some aspects, the device or apparatus 102 may comprise an integrated circuit. Thus, the integrated circuit may comprise one or more processors that provide the functionality of the processor components illustrated in FIG. 2. For example, in some aspects a single processor may implement the functionality of the illustrated processor components, while in other aspects more than one processor may implement the functionality of the illustrated processor components. In addition, in some aspects the integrated circuit may comprise other types of components that implement some or all of the functionality of the illustrated processor components.

Figure 3:
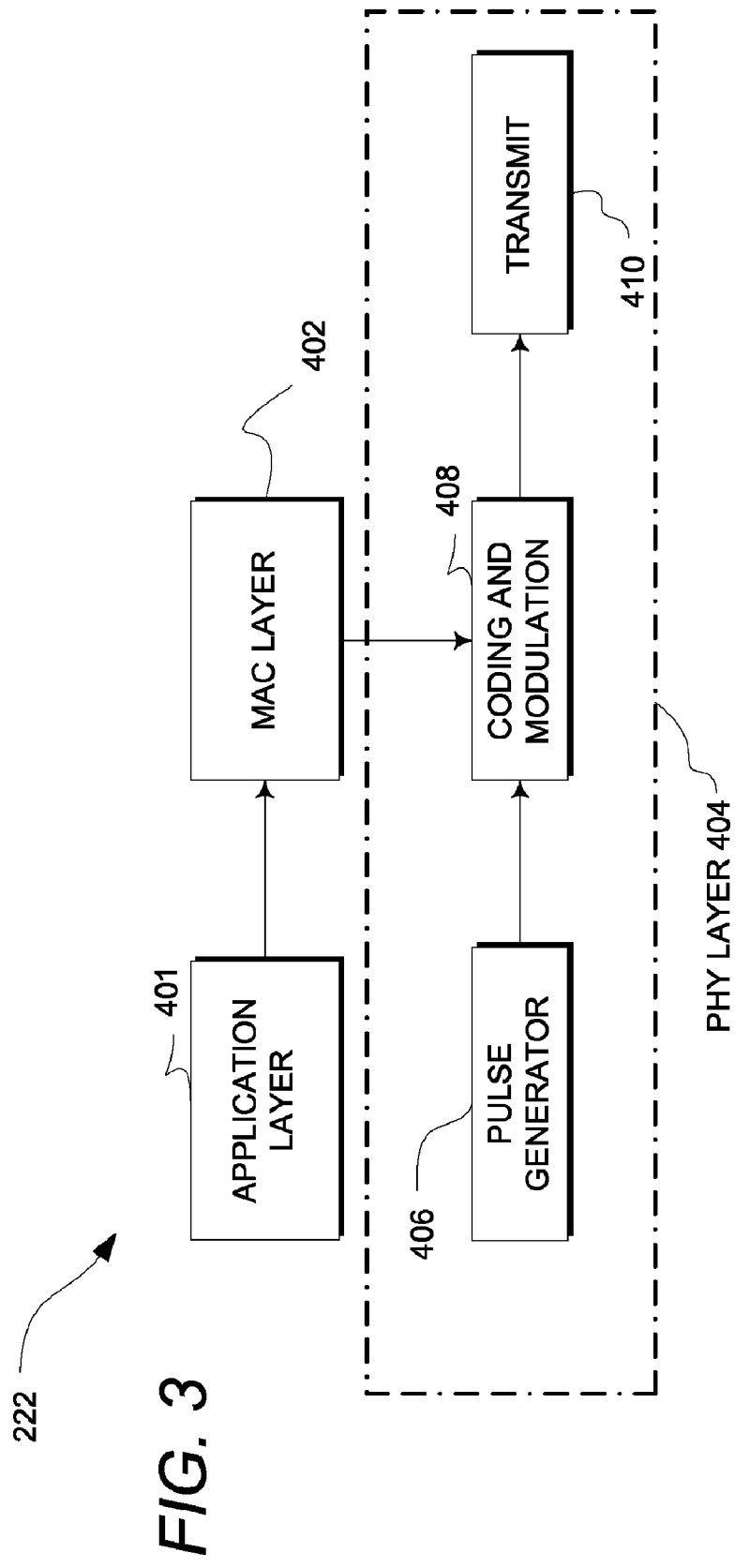
FIG. 3 is a block diagram illustrating a transmitter of a device such as illustrated in FIG. 2.

FIG. 3 is a block diagram illustrating an example of the transmitter 222 of the device 102. As would be apparent to one of skill in the art, in the illustrated block diagram of FIG. 3, logical modules of the device 102 are illustrated in terms of a layered, abstract description for a communications network. As noted below, each layer may comprise one or more logical modules that may be implemented in software, hardware, or any suitable combination of both. The transmitter 222 may include: (i) an application layer 401 that provides information to a data link or media access control (MAC) layer 402 for transmission, (ii) a media access control (MAC) layer 402 that receives data from the application layer 401 and provides it to a physical layer 404, and (iii) a physical (PHY) layer 404 that receives data from the MAC layer 402 and transmits the data over the wireless channel 106. In the illustrated transmitter 222, the PHY layer includes a pulse generator 406, a coding and modulation block 408, and a transmit block 410. A phase locked loop (PLL) (not shown) may provide timing signals to the PHY layer. The pulse generator 406 generates waveforms such as Gaussian pulse waveforms. The coding and modulation block 408 codes the information signal provided by the MAC layer 402 using a coding scheme such as convolutional coding, block coding or concatenated coding and modulates the pulse signal based on the coded information signal using a scheme such as pulse position modulation, pulse amplitude modulation, or transmitted reference modulation. The transmit block 410 transmits the modulated pulse signal. Functions of the transmit block 410 may include amplifying the modulated pulse signal for transmission and providing the signal to an antenna.

Figure 4:
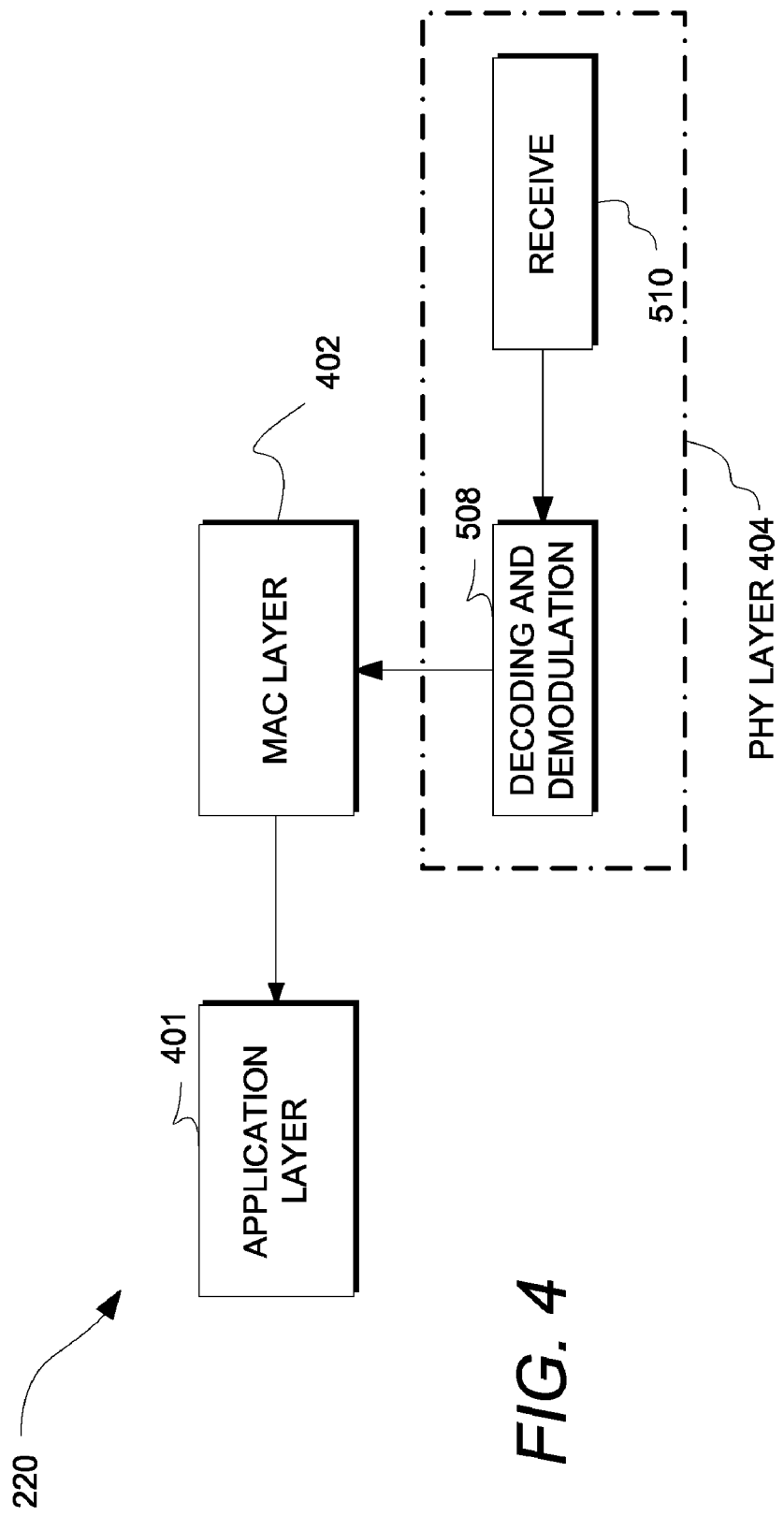
FIG. 4 is a block diagram illustrating a receiver of a device such as illustrated in FIG. 2.

FIG. 4 is a block diagram illustrating an example of the receiver 220 of the device 102. As would be apparent to one of skill in the art, in the illustrated block diagram of FIG. 4, logical modules of the device 102 are illustrated in terms of a layered, abstract description for a communications network. As noted below, each layer may comprise one or more logical modules that may be implemented in software, hardware, or any suitable combination of both. In FIG. 4, the receiver 220 includes the application layer 401 and the MAC layer 402. The PHY layer 404 is in communication with the MAC layer 402. The PHY layer 404 of the receiver includes a demodulation and decoding block 508 and a receive block 510. The receive block 510 may include components (not shown) that may comprise an antenna, a power amplifier, and other suitable receiver components. The receive block 510 receives a wireless signal and provides that signal to the demodulation and decoding block 508, which demodulates and decodes the signal and provides received data to the MAC layer 402.

The receiver 220 and the transmitter 222 may employ a variety of wireless physical layer schemes. For example, the physical layer 404 of the receiver 220 and the transmitter 222 may utilize some form of CDMA, TDMA, OFDM, OFDMA, or other modulation and multiplexing schemes.

Figure 5:
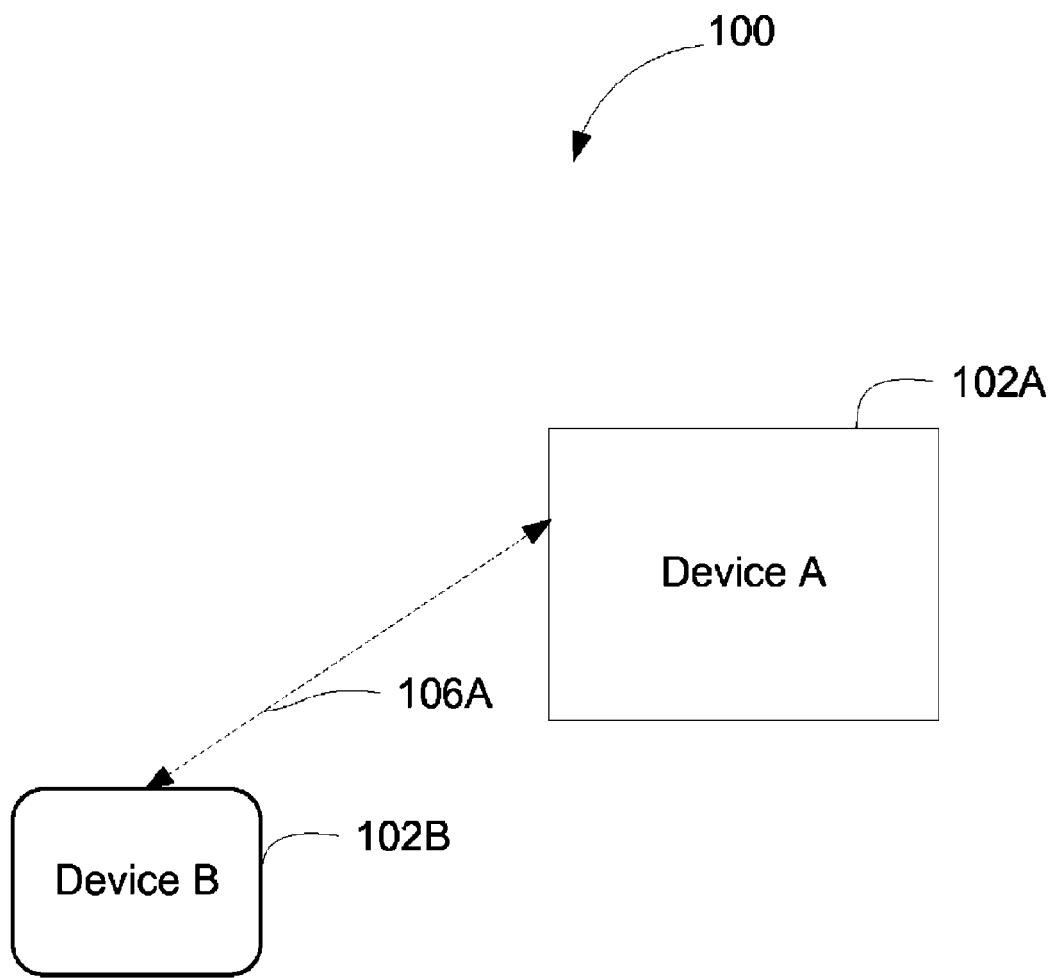
FIG. 5 is a block diagram illustrating another example system of wirelessly connected devices.

FIG. 5 is a block diagram illustrating example of the system 100 of wirelessly connected devices 102. In the example, three devices 102A, 102B, and 102C are illustrated. In a personal-area-network (PAN) wireless communication system such as the system 100, a first device, e.g., the device 102A, discovers and pairs with a second device, e.g., the device 102B. Once paired, the devices 102A and 102B may exchange (user) data packets. During the discovery procedure, the first device 102A learns of the existence of the second device 102B by collecting the device address and other information. During the pairing procedure, the two devices establish security keys that are used in encryption and/or authentication of data packets.

A commonly used method of discovery includes a user initiating a discovery procedure on the first device 102A by pressing a button. The first device 102A broadcasts discovery request message. The first device 102A receives discovery response messages to discover neighboring devices, including the second device 102B with which the first device 102A is to be paired. The first device 102A lists all neighboring devices with names and/or descriptions through a user interface (display). The user selects the second device 102B from the list and initiates the pairing procedure by pressing a button. The first device 102A sends a pairing request message to the second device 102B. The two devices 102A and 102 B exchange messages to establish security keys. Such a method can be cumbersome and inconvenient. To pair the two devices for the first time, a display and multiple button-presses on the first device 102A are used to provide security. Moreover, not only is this procedure cumbersome, the procedure is difficult to extend to many simple devices that lack a display or similar interface.

Figure 6:
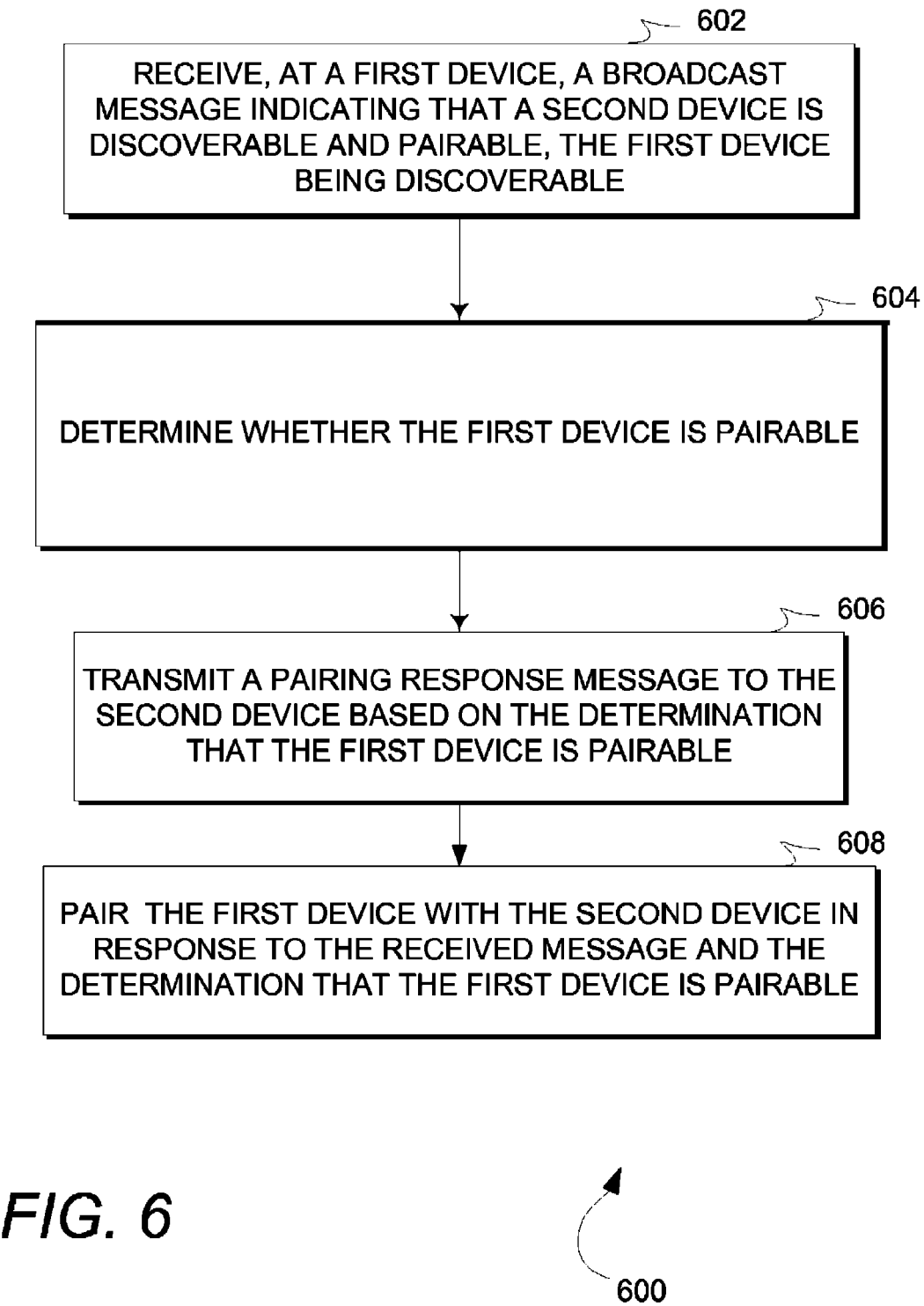
FIG. 6 is a flowchart illustrating an example of a method of pairing devices such as in the example system such as illustrated FIG. 1.

FIG. 6 is a flowchart illustrating an example of a method 600 of pairing devices such as the devices 102A and 102B of FIG. 5. For example, one aspect includes an intuitive way of pairing two devices in which each device directly discovers another device that wants to be paired. According to one aspect, discovery and pairing requests are combined. The method 600 begins at a block 602 in which a discoverable first device, e.g., the device 102A, receives a broadcast discovery-for-pairing message (e.g., from a second device, e.g., the device 102B) indicating that a second device 102B is discoverable and pairable. The discovery-for-pairing message may be a broadcast message that is transmitted to all devices 102 that are configured to receive the message. Next at a block 604, the first device 102A determines whether its state is 'pairable.' For example, the determination may be performed by an integrated circuit such as the processor 202 of the first device 102A. If the first device 102A is not pairable, it may ignore the discovery-for-pairing message from the device 102B. In one aspect, the first device 102A is activated as being pairable. For example, a user may activate the device 102A as being pairable, and thereafter discoverable, by pressing a button on the first device. A second device 102B may also be similarly activated. The first device may temporarily sets itself to be 'pairable,' e.g., for a specified time period. For example, the specified time period may have a duration in a range of 1-60 seconds or a range of 1-10 seconds. For example, the specified time period may have a duration of about 10 seconds. Each of the first and second devices 102A and 102B may broadcast a discovery-for-pairing message (either once or repeatedly at intervals) when their state is set to 'pairable.'

Moving to a block 606, the first device 102A (when pairable) transmits a pairing response message to the second device 102B indicating that the first device 102B received the message and is pairable. The message may also include a device address and other device information. The second device 102B may concurrently conduct a similar operation. The pairing response message may be a broadcast message (a message transmitted or addressed to any device 102 configured to receive the message) or a unicast message (a message transmitted or addressed to a specific device 102). Moving to a block 608, the first device 102A pairs with the second device 102B in response to the received message and the determination that the first device 102A is pairable. Pairing the two devices 102A and 102B may include exchange of other data such as data to establish security and/or encryption keys. The first and second devices 102A and 102B may thus automatically pair once both are within range and have been activated for pairing.

In one aspect, the pairing may include an authentication procedure. For example, the method 600 may further include determining a distance between the first and second devices 102A and 102B based on at least one signal transmitted by the second device 102B. The first and second devices are automatically paired if the distance is within a defined distance, for example, within a distance of about 1 meter. This helps to limit pairing only to devices of the user based on distance to other users.

Thus, for example, in one use case, a user activates two devices 102A and 102B for pairing by pressing a button on each device. Each device 102A and 102B is activated for pairing for a specified time, e.g., 30 seconds. The devices 102A and 102B exchange discovery and pairing messages and pair with each other. In such a typical use case, no other pairable device is likely to be within range, particularly within the specified time period, thus all of the unnecessary complexity of common pairing procedures is avoided and two devices without displays can be paired. In one aspect, the devices 102A and 102B may be further configured to pair only with devices within a specified distance, such as about 1 meter, to further minimize unintended pairings. In one aspect, the pairing is automatically performed when two such devices are activated for pairing, optionally limited to devices activated within the specified time and, also optionally, within the specified distance. In one aspect, the pairing procedure may include a user confirmation, e.g., by emitting a tone and awaiting a user input such as a button press, to further minimize undesired pairings.

As pairing is typically a one-off or infrequent occurrence, there are likely that the only discoverable devices within range that are not paired are the two devices to be paired. Thus, in one aspect, the use of a display for selecting a device to pair may not be needed or utilized thus streamlining the process of pairing and making it easier to pair simple devices. Moreover, the method 600 is intuitive to end-user because he or she can simply hold the two devices 102A and 102B in two hands, press a button on both devices, and wait for pairing to succeed.

The above method 600 may briefly be expressed with respect to the value of a discovery state (DS) variable that may be defined such that DS=1 denotes "discoverable" and DS=2 denote "discoverable and pairable". Devices 102 may also have other states such as not-discoverable, e.g., DS=0. The second device 102B transmits a request message that carries the DS value of the second device (DS_2), e.g., $DS_{\_1}=2$. The first device 102A receives the request message and compares the value of DS_2 with the DS value of the first device (DS_1). If DS_1>=DS_2, the first device 102A transmits a response message that carries DS_1. As a result, the second device 102B discovers the first device if DS_1>=DS_2. If the discovery state of the first device 102A is 2, or pairable, the device 102A may respond with a pairing response and proceed to allow the devices to be paired.

TABLE 1

| State - First Device | State - Second Device | Result |
| --- | --- | --- |
| Discoverable (DS = 1) | Discoverable and Pairable (DS = 2) | Devices may discover each other and exchange identifying information. Optionally, more complex pairing may be performed. |
| Discoverable and Pairable (DS = 2) | Discoverable and Pairable (DS = 2) | Devices pair (e.g., automatically). |
| Not-Discoverable (DS = 0) | Discoverable (DS = 1) or Discoverable and Pairable (DS = 2) | First device may receive identifying information from the second device but may ignore the second device. Optionally, the first device may become discoverable and/or pairable based on user's inputs. |

Figure 7:
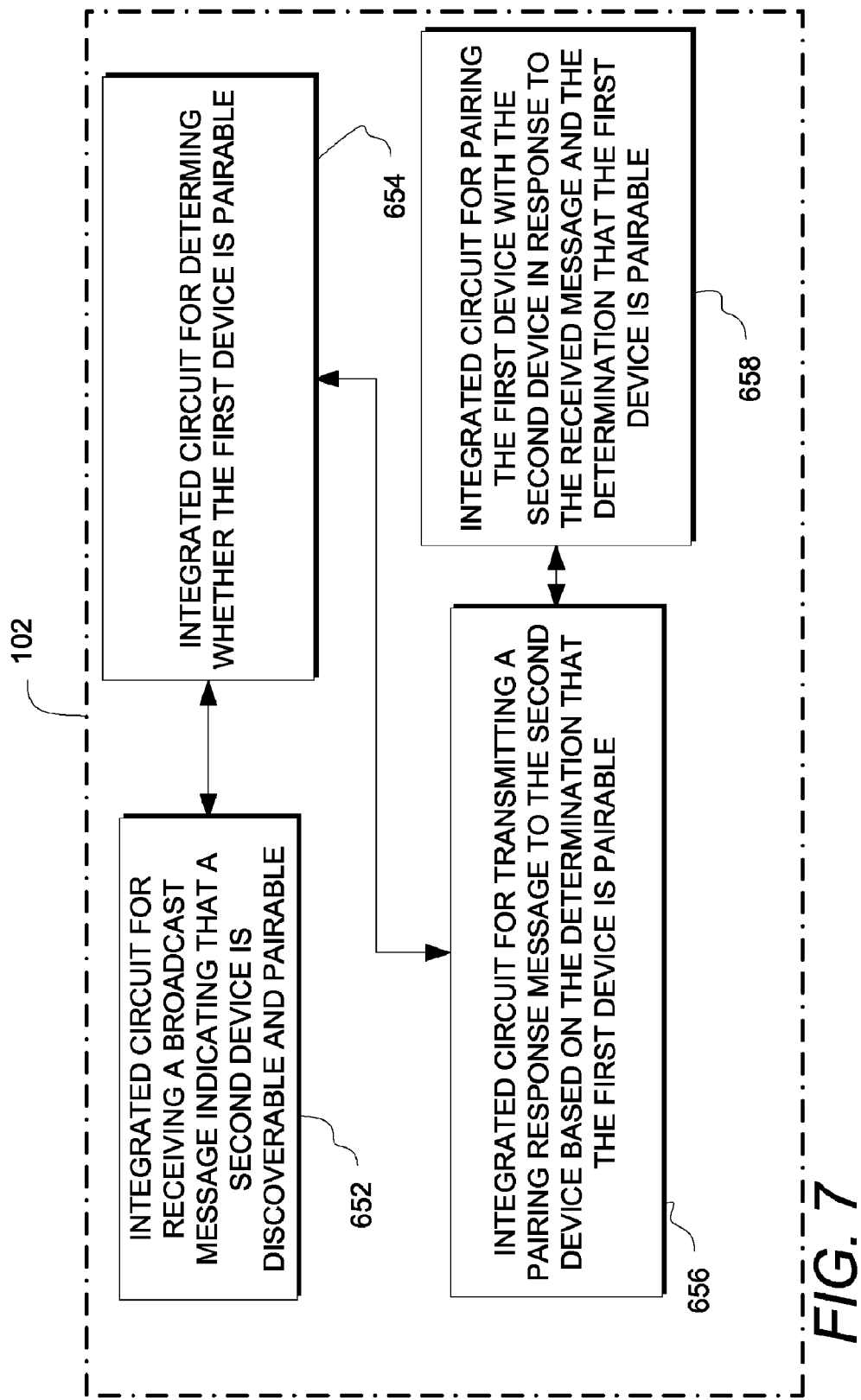
FIG. 7 is a block diagram illustrating an example of a device that pairs to other devices using a method such as illustrated in FIG. 6.

FIG. 7 is a block diagram illustrating an example of the devices 102A and 102B pairing using the method 600 of FIG. 6. In the illustrated example, the device 102, e.g., the device 102A of FIG. 5, comprises a means or an integrated circuit (IC) 652 for receiving a broadcast message indicating that a second device 102B is discoverable and pairable. The IC 652 may comprise the receiver 220 of FIGS. 2 and 4. The IC 652 may be configured to monitor for the broadcast message when it is discoverable. The device 102A also comprises a means or an IC 654 for determining whether the first device is pairable. The IC 654 may comprise the processor 202 of FIG. 2. The device 102A also comprises a means or an IC 656 for transmitting a pairing response message to the first device based on the determination that the first device is pairable. The IC 656 may comprise the transmitter 222 of FIGS. 2 and 3. The device 102A also comprises a means or an IC 658 for pairing the first device with the second device in response to the received message and the determination that the first device is pairable. The IC 658 may comprise the processor 202 of FIG. 2.

In view of the above, one will appreciate that the disclosure addresses how to associate devices for communicating data, such as a UWB system. For example, the illustrated aspects provide a simpler and more user friendly way of pairing devices to define a personal or body area network.

It is to be recognized that depending on the embodiment, certain acts or events of any of the methods described herein can be performed in a different sequence, may be added, merged, or left out all together (e.g., not all described acts or events are necessary for the practice of the method). Moreover, in certain embodiments, acts or events may be performed concurrently, e.g., through multi-threaded processing, interrupt processing, or multiple processors, rather than sequentially.

Those of skill will recognize that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. Moreover, in some aspects any suitable computer-program product may comprise a computer-readable medium comprising codes relating to one or more of the aspects of the disclosure. In some aspects a computer program product may comprise packaging materials.

While the above detailed description has shown, described, and pointed out novel features of the invention as applied to various embodiments, it will be understood that various omissions, substitutions, and changes in the form and details of the device or process illustrated may be made by those skilled in the art without departing from the scope of the invention. As will be recognized, the invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A method of associating electronic devices for communicating data, comprising:
   receiving, at a first device, at least one single broadcast discovery and pairing message comprising a variable that denotes that a second device is discoverable and pairable, wherein said first device being discoverable, and further wherein the discovery and pairing message is received at a time when the first device has yet to discover the second device;
   determining whether the first device is pairable;
   transmitting a pairing response message to the second device based on the determination that the first device is pairable; and
   pairing the first device to the second device in response to the received message and the determination that the first device is pairable.

2. The method of claim 1, further comprising monitoring for the broadcast message if the first device is discoverable.

3. The method of claim 1, wherein the pairing response message comprises a broadcast message.

4. The method of claim 1, wherein the pairing response message comprises a unicast message.

5. The method of claim 1, further comprising activating the first device as being pairable.

6. The method of claim 5, wherein the activation is for a specified duration.

7. The method of claim 6, wherein the specified duration comprises a period of time of one to thirty seconds.

8. The method of claim 6, wherein the specified duration comprises a period of time of ten seconds.

9. The method of claim 5, wherein activating the first device as being pairable comprises receiving a user input.

10. The method of claim 1, wherein pairing comprises automatically pairing in response to receiving the received broadcast message.

11. The method of claim 1, wherein pairing comprises:
    determining a distance between the first and second devices based on at least one signal transmitted by the second device, wherein the first and second devices are paired if the distance is within a defined distance.

12. The method of claim 11, wherein the defined distance is 1 meter.

13. The method of claim 1, wherein at least one of the transmitted and received messages comprises at least one pulse.

14. The method of claim 13, wherein the at least one pulse has a fractional bandwidth of at least 20%, has a bandwidth of at least 500 MHz, or has a fractional bandwidth of at least 20% and has a bandwidth of at least 500 MHz.

15. An electronic device for wireless communications, comprising:
    a receiver configured to receive at least one single broadcast discovery and pairing message comprising a variable that denotes that a second device is discoverable and pairable, wherein the electronic device is discoverable, and further wherein the discovery and pairing message is received at a time when the electronic device has yet to discover the second device;
    an integrated circuit configured to determine whether the electronic device is pairable; and
    a transmitter configured to transmit a pairing response message to the second device based on the determination that the electronic device is pairable,
    wherein the integrated circuit is further configured to pair the electronic device to the second device in response to the received message and the determination that the electronic device is pairable.

16. The device of claim 15, wherein the receiver is configured to monitor for the broadcast message if the electronic device is discoverable.

17. The device of claim 15, wherein the pairing response message comprises a broadcast message.

18. The device of claim 15, wherein the pairing response message comprises a unicast message.

19. The device of claim 15, wherein the integrated circuit is further configured to activate the electronic device as being pairable.

20. The device of claim 19, wherein the activation is for a specified duration.

21. The device of claim 20, wherein the specified duration comprises a period of time of one to thirty seconds.

22. The device of claim 20, wherein the specified duration comprises a period of time of ten seconds.

23. The device of claim 19, further comprising an input device configured to receive a user input, and wherein the integrated circuit is configured to activate the electronic device as being pairable in response to an input received by the input device.

24. The device of claim 15, wherein the integrated circuit is configured to automatically pair in response to receiving the received broadcast message.

25. The device of claim 15, wherein the integrated circuit is configured to determine a distance between the electronic device and the second devices based on at least one signal transmitted by the second device and received by the receiver, wherein the integrated circuit is configured to pair the electronic device and the second devices if the distance is within a defined distance.

26. The device of claim 25, wherein the defined distance is 1 meter.

27. The device of claim 15, wherein at least one of the transmitted and received messages comprises at least one pulse.

28. The device of claim 27, wherein the at least one pulse has a fractional bandwidth of at least 20%, has a bandwidth of at least 500 MHz, or has a fractional bandwidth of at least 20% and has a bandwidth of at least 500 MHz.

29. An electronic device for wireless communications, comprising:
means for receiving at least one single broadcast discovery and pairing message at the electronic device comprising a variable that denotes that a second device is discoverable and pairable, wherein the electronic device is discoverable, wherein the discovery and pairing message is received at a time when the electronic device has yet to discover the second device;
means for determining whether the electronic device is pairable;
means for transmitting a pairing response message to the second device based on the determination that the electronic device is pairable; and
means for pairing the electronic device to the second device in response to the received message and the determination that the electronic device is pairable.

30. The device of claim 29, wherein the receiving means is configured to monitor for the broadcast message if the electronic device is discoverable.

31. The device of claim 29, wherein the pairing response message comprises a broadcast message.

32. The device of claim 29, wherein the pairing response message comprises a unicast message.

33. The device of claim 29, further comprising means for activating the electronic device as being pairable.

34. The device of claim 33, wherein the activation is for a specified duration.

35. The device of claim 34, wherein the specified duration comprises a period of time of one to thirty seconds.

36. The device of claim 34, wherein the specified duration comprises a period of time of ten seconds.

37. The device of claim 33, further comprising means for receiving a user input, and wherein the activating means is configured to activate the electronic device as being pairable in response to an input received by the input means.

38. The device of claim 29, wherein the pairing means is configured to automatically pair in response to receiving the received broadcast message.

39. The device of claim 29, further comprising means for determining a distance between the electronic device and the second devices based on at least one signal transmitted by the second device and received by the receiver, wherein the pairing means is configured to pair the electronic device and the second devices if the distance is within a defined distance.

40. The device of claim 39, wherein the defined distance is 1 meter.

41. The device of claim 29, wherein at least one of the transmitted and received messages comprises at least one pulse.

42. The device of claim 41, wherein the at least one pulse has a fractional bandwidth of at least 20%, has a bandwidth of at least 500 MHz, or has a fractional bandwidth of at least 20% and has a bandwidth of at least 500 MHz.

43. A computer-program product for wireless communications, comprising:
computer non-transitory readable medium comprising codes executable by at least one computer to:
receive at least one single broadcast discovery and pairing message at a first device comprising a variable that denotes that a second device is discoverable and pairable, wherein the first device is discoverable, and further wherein the discovery and pairing message is received at a time when the first device has yet to discover the second device;
determine whether the first device is pairable;
transmit a pairing response message to the second device based on the determination that the first device is pairable; and
pair the first device to the second device in response to the received message and the determination that the first device is pairable.

44. A headset for wireless communications, comprising:
a microphone adapted to provide sensed data;
a receiver configured to receive at least one single broadcast discovery and pairing message comprising a variable that denotes that a second device is discoverable and pairable, wherein the headset is discoverable, and further wherein the discovery and pairing message is received at a time when the headset has yet to discover the second device;
an integrated circuit configured to determine whether the headset is pairable; and
a transmitter configured to transmit a pairing response message to the second device based on the determination that the headset is pairable,
wherein the integrated circuit is further configured to pair the headset to the second device in response to the received message and the determination that headset is pairable and
wherein the transmitter is further configured to transmit a signal based on the sensed data.

45. A sensed device for wireless communications, comprising:
a sensor adapted to provide sensed data;
a receiver configured to receive at least one single broadcast discovery and pairing message comprising a variable that denotes that a second device is discoverable and pairable, wherein the sensed device is discoverable, and further wherein the discovery and pairing message is received at a time when the sensed device has yet to discover the second device;

an integrated circuit configured to determine whether the sensed device is pairable; and a transmitter configured to transmit a pairing response message to the second device based on the determination that the sensed device is pairable, wherein the integrated circuit is further configured to pair the sensed device to the second device in response to the received message and the determination that the sensed device is pairable and wherein the transmitter is further configured to transmit a signal based on the sensed data.

46. A watch for wireless communications, comprising:

a receiver configured to receive at least one single broadcast discovery and pairing message comprising a variable that denotes that a second device is discoverable and pairable, wherein the watch is discoverable, and further wherein the discovery and pairing message is received at a time when the watch has yet to discover the second device;

an integrated circuit configured to determine whether the watch is pairable;

a transmitter configured to transmit a pairing response message to the second device based on the determination that the watch is pairable, wherein the integrated circuit is further configured to pair the watch to the second device in response to the received message and the determination that the watch is pairable; and a display adapted to provide a visual output based on data received via the receiver.

* * * * *